United States Patent [19]

Grace et al.

[11] Patent Number: 4,892,893

[45] Date of Patent: Jan. 9, 1990

[54] FLAME RETARDANT POLYURETHANE FOAMS RESISTANT TO CIGARETTE SMOLDERING IGNITION

[75] Inventors: Oscar M. Grace, Troy; Theodore M. Smiecinski, Woodhaven; Steven E. Wujcik, Romulus, all of Mich.

[73] Assignee: BASF Corporation, Parsippany, N.J.

[21] Appl. No.: 312,990

[22] Filed: Feb. 17, 1989

[51] Int. Cl.$^4$ ............................................ C08G 18/14
[52] U.S. Cl. .................................... 521/128; 521/129; 521/137; 521/163; 521/166; 521/906
[58] Field of Search .............. 521/128, 137, 166, 906, 521/129, 163

[56] References Cited

U.S. PATENT DOCUMENTS

| | | | |
|---|---|---|---|
| 4,221,875 | 9/1980 | Yukuta et al. | 521/128 |
| 4,258,141 | 1/1981 | Jarre et al. | 521/114 |
| 4,293,657 | 10/1981 | Nissen et al. | 521/121 |
| 4,317,889 | 3/1982 | Pcolinsky | 521/166 |
| 4,644,015 | 2/1987 | Scaccia et al. | 521/128 |
| 4,745,133 | 5/1988 | Gruibergs et al. | 521/128 |
| 4,826,884 | 5/1989 | Grace et al. | 521/128 |

*Primary Examiner*—Morton Foelak
*Attorney, Agent, or Firm*—William G. Conger

[57] ABSTRACT

The invention pertains to flame retardant flexible polyurethane foams resistant to cigarette smoldering after being subjected to flex fatigue, prepared by reacting a conventional polyether polyol, toluene diisocyanate, and a blowing agent, and incorporating substantially uncrushed melamine in an amount ranging from about 5 weight percent to about 25 weight percent.

20 Claims, 2 Drawing Sheets

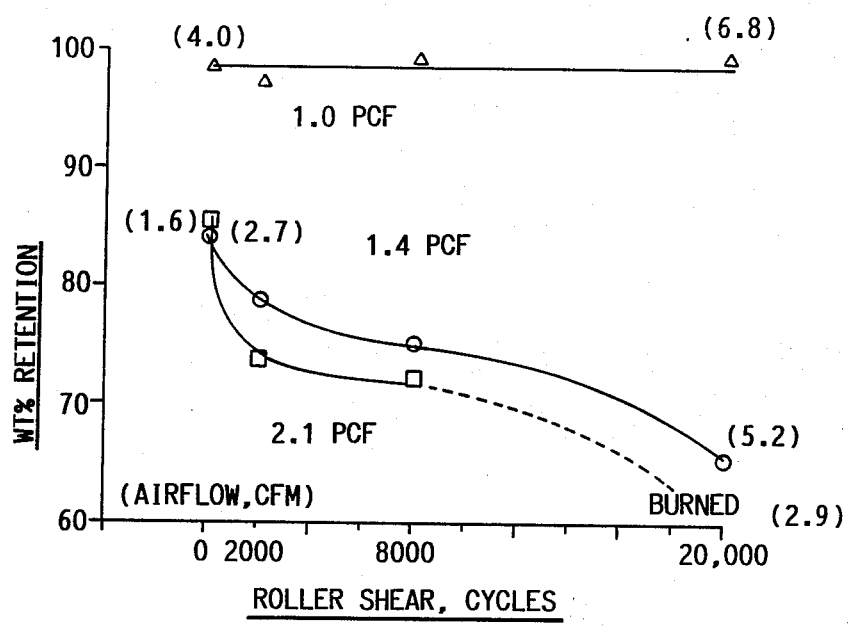
/Fig-1
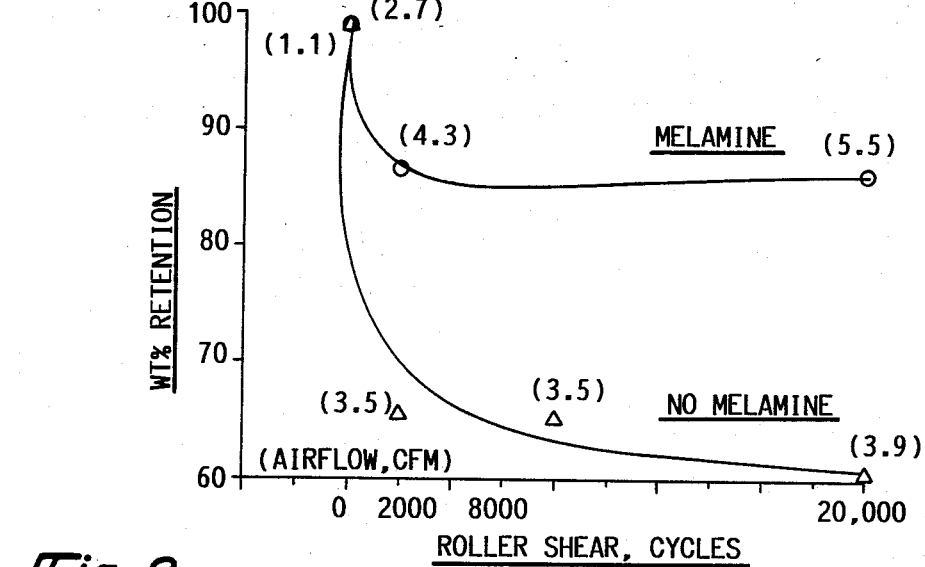
/Fig-2

FLAME RETARDANT POLYURETHANE FOAMS RESISTANT TO CIGARETTE SMOLDERING IGNITION

BACKGROUND OF THE INVENTION

1. Field on the Invention

The present invention pertains to flexible foam compositions and in particular to flexible polyurethane flame-retarded foam compositions and methods for the preparation thereof. More particularly, the present invention relates to the preparation of flexible polyurethane flame-retarded foam compositions which will retain their resistance to cigarette smoldering even after service.

2. Description of the Prior Art

The preparation of flexible polyurethane flame-retardant foam compositions are generally well known as evidenced by the following prior art. U.S. Pat. No. 4,022,718 teaches the preparation of high resilience cold-cured polyurethane foams incorporating 2,3-dibromo-1,4-butenediol as a chain extender and flame-retardant component. U.S. Pat. No. 4,147,847 teaches a method of preparing flexible, flame-retarded, polyurethane foams by employing specific foam stabilizers which reduce the required amount of normal flame-retardant additives. U.S. Pat. No. 4,162,353 teaches the preparation of flexible polyurethane foams incorporating therein a halo-substituted alkyl phosphate such as, for example, tris(2-chloroethyl)-phosphate and an unsubstituted trialkylphosphate such as, for example, triethylphosphate. U.S. Pat. No. 4,221,875 teaches the preparation of rigid polyurethane foam incorporating melamine as the sole flame retardant component. U.S. Pat. No. 4,293,657 teaches the use of melamine dispersions in polyol wherein the melamine has a particle size of less than 10 $\mu$m and is produced by crushing in situ in the polyol at high localized energy densities. A dispersion stabilizer is also a necessary ingredient of the dispersion. U.S. Pat. No. 4,385,131 teaches the preparation of rebonded polyurethane foam incorporating urea and/or melamine for resistance to smoldering combustion. None of the prior art teaches, however, that incorporating an amount of melamine from about 5 weight percent to about 25 weight percent of the weight of the flexible foam, having a density from about 1.2 lbs/ft$^3$ to about 4 lbs/ft$^3$ will result in a foam resistant to cigarette smoldering upon being subjected to flex fatigue similar to actual survive.

SUMMARY OF THE INVENTION

The present invention applies to both highresiliency, flexible polyurethane foam compositions and conventional flexible polyurethane foam compositions which retain their cigarette smoldering resistance after service comprising (a) a polyoxyalkylene polyether polyol, (b) toluenediisocyanate, (c) a blowing agent, (d) a catalyst, (e) a surfactant, (f) substantially uncrushed melamine, and (g) optionally chain extenders and flame retardants other than melamine, wherein the concentration of melamine is from about 5 weight percent to about 25 weight percent based on the weight of the foam and wherein the density of the foam is from at least 1.2 lbs/ft$^3$ to about 4 lbs/ft$^3$.

For a more complete understanding of the present invention, reference is made to the following detailed description and the examples thereof.

DESCRIPTION OF THE FIGURES

FIG. I illustrates the effect of Roller shear fatigue on cigarette smoldering resistance of polyurethane foam in the absence of melamine at densities of 1.0, 1.4, and 2.1 pcf.

FIG. II illustrates the effect of Roller shear fatigue on cigarette smoldering resistance of polyurethane foam in the absence and presence of 20 pbw melamine at a density of 1.6 pcf.

Figure 3:
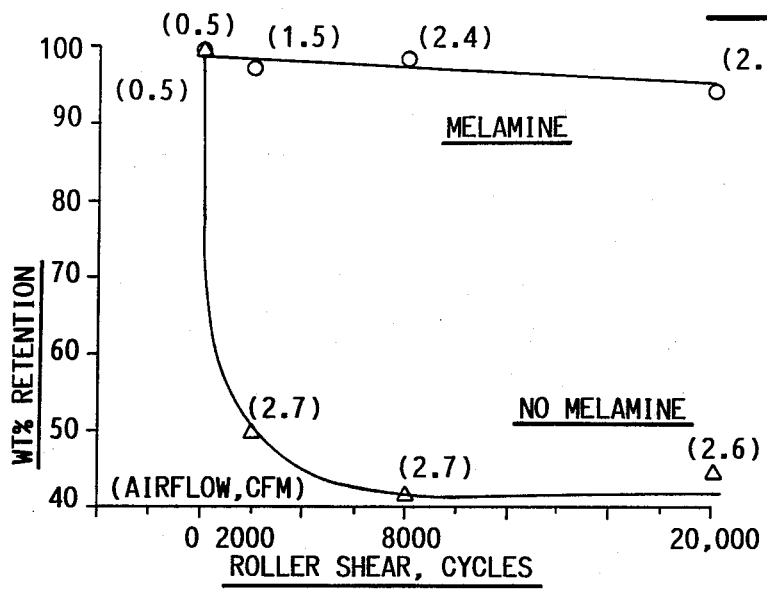
Figure 4:
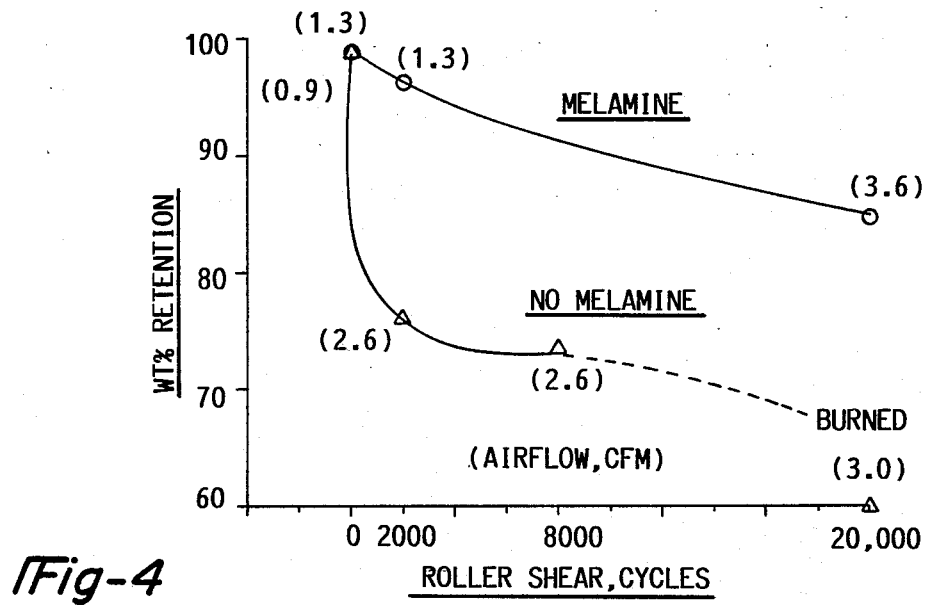

FIG. III illustrates the effect of Roller shear fatigue on cigarette smoldering resistance of polyurethane foam in the absence and presence of 20 pbw melamine at a density of 2.3 pcf.

FIG. IV illustrates the effect of Roller shear fatigue on cigarette smoldering resistance of polyurethane foam in the absence and presence of 20 pbw melamine at a density of 2.5 pcf.

DESCRIPTION OF THE PREFERRED EMBODIMENTS

It has unexpectedly been found that in the preparation of flexible flame-retarded polyurethane foam, the addition of substantially uncrushed melamine to conventional polyoxyalkylene polyether polyols results in foam which will retain its cigarette smoldering resistance even after being subjected to flex fatigue similar to actual service. It has been found that melamine in the amount ranging from about 5 weight percent to about 25 weight percent of the weight of the foam will enable polyurethane foam to be prepared which will retain its resistance to cigarette smoldering.

Flexible foams are generally defined as having a high tensile to compressive strength ratio (25% deflection) from 15 to 60 or 70 to 1, high elongation, a fast recovery rate and a high elastic limit. Rigid foams on the other hand have a high ratio of compressive to tensile strength, 0.5 to 1 or greater, low elongation (less than 10%), a low recovery rate from distortion, and a low elastic limit.

Representative polyols which may be employed in the preparation of the flexible flame retardant polyurethane foams of the subject invention are well known to those skilled in the art. They are often prepared by the catalytic condensation of an alkylene oxide or mixture of alkylene oxides either simultaneously or sequentially with an organic compound having at least two active hydrogen atoms, such as evidenced by U.S. Pat. Nos. 1,922,459; 3,190,927; and 3,346,557. Representative polyols include polyhydroxyl-containing polyesters, polyoxyalkylene polyether polyols, polyhydroxy-terminated polyurethane polymers, polyhydroxyl-containing phosphorus compounds, and alkylene oxide adducts of polyhydric polythioesters, polyacetals, aliphatic polyols and thiols, ammonia, and amines including aromatic, aliphatic, and heterocyclic amines, as well as mixtures thereof. Alkylene oxide adducts of compounds which contain 2 or more different groups within the above-defined classes may also be used, for example, amino alcohols which contain an amino group and a hydroxyl group. Also, alkylene oxide adducts of compounds which contain one SH group and one OH group as well as those which contain an amino group and an SH group may be used. Generally, the polyols will have an equivalent weight from 1000 to 10,000, preferably from 1500 to 3000 and a functionality of two to four.

Any suitable polyoxyalkylene polyether polyol may be used such as the polymerization product of an alkylene oxide or a mixture of alkylene oxides with a polyhydric alcohol. Any suitable polyhydric alcohol may be used such as those disclosed above for use in the preparation of the hydroxy-terminated polyesters. Any suitable alkylene oxide may be used such as ethylene oxide, propylene oxide, butylene oxide, amylene oxide, and mixtures of these oxides. The polyoxyalkylene polyether polyols may be prepared from other starting materials such as tetrahydrofuran and alkylene oxide-tetrahydrofuran mixtures; epihalohydrins such as epichlorohydrin; as well as aralkylene oxides such as styrene oxide. The polyoxyalkylene polyether polyols may have either primary or secondary hydroxyl groups. Included among the polyether polyols are polyoxyethylene glycol, polyoxypropylene glycol, polyoxybutylene glycol, polytetramethylene glycol, block copolymers, for example, combinations of polyoxypropylene and polyoxyethylene glycols, poly-1,2-oxybutylene and polyoxyethylene glycols, poly-1,4-oxybutylene and polyoxyethylene glycols, and random copolymer glycols prepared from blends of two or more alkylene oxides or by the sequential addition of two or more alkylene oxides. The polyoxyalkylene polyether polyols may be prepared by any known process such as, for example, the process disclosed by Wurtz in 1859 and *Encyclopedia of Chemical Technology*, Vol. 7, pp. 257-262, published by Interscience Publishers, Inc. (1951) or in U.S. Pat. No. 1,922,459. Polyethers which are preferred include the alkylene oxide addition products of trimethylolpropane, glycerine, pentaerythritol, sucrose, sorbitol, propylene glycol, and 2,2'-(4,4'-hydroxyphenyl)propane and blends thereof having equivalent weights of from 1000 to 10,000. The polyoxyalkylene polyether polyols may be used alone or in admixture with a minor quantity of other conventional polyurethane polyols as described below.

Any suitable hydroxy-terminated polyester may be used such as are prepared, for example, from polycarboxylic acids and polyhydric alcohols. Any suitable polycarboxylic acid may be used such as oxalic acid, malonic acid, succinic acid, glutaric acid, adipic acid, pimelic acid, suberic acid, azelaic acid, sebacic acid, brassylic acid, thapsic acid, maleic acid, fumaric acid, glutaconic acid, α-hydromuconic acid, β-hydromuconic acid, α-butyl-α-ethyl-glutaric acid, α,β-diethylsuccinic acid, isophthalic acid, terephthalic acid, hemimellitic acid, and 1,4-cyclohexanedicarboxylic acid. Any suitable polyhydric alcohol, including both aliphatic and aromatic, may be used such as ethylene glycol, propylene glycol, trimethylene glycol, 1,2-butanediol, 1,3-butanediol, 1,4-butanediol, 1,2-pentanediol, 1,4-pentanediol, 1,5-pentanediol, 1,6-hexanediol, 1,7-heptanediol, glycerol, 1,1,1-trimethylolpropane, 1,1,1-trimethylolethane, 1,2,6-hexanetriol, α-methyl glucoside, pentaerythritol, and sorbitol. Also included within the term "polyhydric alcohol" are compounds derived from phenol such as 2,2-bis(4-hydroxyphenyl)propane, commonly known as Bisphenol A.

The hydroxyl-containing polyester may also be a polyester amide such as is obtained by including some amine or amino alcohol in the reactants for the preparation of the polyesters. Thus, polyester amides may be obtained by condensing an amino alcohol such as ethanolamine with the polycarboxylic acids set forth above or they may be made using the same components that make up the hydroxyl-containing polyester with only a portion of the components being a diamine such as ethylene diamine.

Suitable polyhydric polythioethers which may be condensed with alkylene oxides include the condensation product of thiodiglycol or the reaction product of a dicarboxylic acid such as is disclosed above for the preparation of the hydroxyl-containing polyesters with any other suitable thioether glycol.

Polyhydroxyl-containing phosphorus compounds which may be used include those compounds disclosed in U.S. Pat. No. 3,639,542. Preferred polyhydroxyl-containing phosphorus compounds are prepared from alkylene oxides and acids of phosphorus having a $P_2O_5$ equivalency of from about 72 percent to about 95 percent.

Suitable polyacetals which may be condensed with alkylene oxides include the reaction product of formaldehyde or other suitable aldehyde with a dihydric alcohol or an alkylene oxide such as those disclosed above.

Suitable aliphatic thiols which may be condensed with alkylene oxides include alkanethiols containing one or two —SH groups such as 2-mercaptoethanol, 1,2-ethanedithiol, 1,2-propanedithiol, 1,3-propanedithiol, and 1,6-hexanedithiol; alkene thiols such as 2-butene-1,4-dithiol; and alkyne thiols such as 3-hexyne-1,6-dithiol.

Suitable amines which may be condensed with alkylene oxides include aromatic amines such as aniline, o-chloroaniline, p-aminoaniline, 1,5-diaminonaphthalene, methylene dianiline, the condensation products of aniline and formaldehyde, and 2,3- 2,6-, 3,4-, 2,5-, and 2,4-diaminotoluene; aliphatic amines such as methylamine, triisopropanolamine, ethylenediamine, 1,3-diaminopropane, 1,3-diaminobutane, 1,4-diaminobutane, and ammonia.

Also, polyols containing ester groups can be employed in the subject invention. These polyols are prepared by the reaction of an alkylene oxide with an organic dicarboxylic acid anhydride and a compound containing reactive hydrogen atoms. A more comprehensive discussion of these polyols and their method of preparation can be found in U.S. Pat. Nos. 3,585,185; 3,639,541 and 3,639,542. In conjunction with the conventional polyoxyalkylene polyols of the subject invention, minor amounts of polymer modified polyols such as those described in U.S. Pat. No. 4,374,209 and prepared by reacting an alkanolamine with a polyisocyanate in the presence of a carrier polyol may be used, or polymer modified polyols such as those prepared in Great Britain Patent No. 1,501,172. The amounts of polymer modified polyol or graft polyol as described below must be such that the solids content is less than 10 percent by weight, preferably less than 5 percent by weight based on the total polyol component weight.

The graft polyols mentioned above, which may be used in minor amounts, incorporated therein vinylic polymers. These polyols may be prepared (1) by the in situ free-radical polymerization of an ethylenically unsaturated monomer or mixture of monomers in a polyol, or (2) by dispersion in a polyol of a preformed graft polymer prepared by free-radical polymerization in a solvent such as described in U.S. Pat. Nos. 3,931,092; 4,014,846; 4,093,573; and 4,122,056, the disclosures of which are herein incorporated by reference, or (3) by low temperature polymerization in the presence of chain transfer agents. These polymerizations may be carried out at a temperature between 65° C. and 170° C., preferably between 75° C. and 135° C.

The polyols which may be employed in the preparation of the graft polymer dispersions are well known in the art. Both conventional polyols essentially free from ethylenic unsaturation such as those described in U.S. Reissue Pat. No. 28,715 and unsaturated polyols such as those described in U.S. Pat. No. 3,652,659 and Reissue No. 29,014 may be employed in preparing the graft polymer dispersions used in the instant invention, the disclosures of which are incorporated by reference. While mixtures of graft polymer dispersions or polymer modified polyols with conventional polyols may be employed, it is preferred to use conventional polyols alone. In the claims which follow, the term "conventional polyol" should be taken as including both conventional polyols utilized alone, or together with a most minor amount of graft or polymer modified polyol such that the added graft or polymer modified polyol does not alter the essential characteristics and properties of the conventional polyol, especially as reflected by the flammability properties of the foam prepared therefrom.

The polyurethane foams employed in the present invention are generally prepared by the reaction of a conventional, polyoxyalkylene polyether polyol with an organic polyisocyanate in the presence of a blowing agent and optionally in the presence of additional polyhydroxyl-containing components, chain-extending agents, catalysts, surface-active agents, stabilizers, dyes, fillers and pigments. Suitable processes for the preparation of cellular polyurethane foams are disclosed in U.S. Reissue Pat. No. 24,514 together with suitable machinery to be used in conjunction therewith. When water is added as the blowing agent, corresponding quantities of excess isocyanate to react with the water and produce carbon dioxide may be used.

It is possible to proceed with the preparation of the polyurethane foams by a prepolymer technique wherein an excess of organic polyisocyanate is reacted in a first step with the polyol of the present invention to prepare a prepolymer having free isocyanate groups which is then reacted in a second step with water and/or additional polyol to prepare a foam.

Alternatively, the components may be reacted in a single working step commonly known as the "one-shot" technique of preparing polyurethanes. Furthermore, instead of water, low boiling hydrocarbons such as pentane, hexane, heptane, pentene, and heptene; azo compounds such as azohexahydrobenzodinitrile; halogenated hydrocarbons such as dichlorodifluoromethane, trichlorofluoromethane, dichlorodifluoroethane, vinylidene chloride, and methylene chloride may be used as blowing agents.

The organic isocyanate component should be predominately toluenediisocyanate, generally available commercially as a mixture of 2,4- and 2,6-toluenediisocyanate. Crude toluenediisocyanate may also be used. While the isocyanate component must be predominately toluenediisocyanate, it would not depart from the spirit of the invention to use minor amounts, i.e. not greater than 30 weight percent, and preferably less than 10 weight percent of other isocyanates.

Among the other organic polyisocyanates which may be employed in admixture with toluenediisocyanate are aromatic, aliphatic, and cycloaliphatic polyisocyanates and combinations thereof. Representative of these types are the diisocyanates such as m-phenylene diisocyanate, hexamethylene diisocyanate, tetramethylene diisocyanate, cyclohexane-1,4-diisocyanate, hexahydrotoluene diisocyanate (and isomers), naphthalene-1,5-diisocyanate, 1-methoxyphenyl-2,4-diisocyanate, 4,4'-diphenylmethane diisocyanate, 4,4'-biphenylene diisocyanate, 3,3'-dimethoxy-4,4'-biphenyl diisocyanate, 3,3'-dimethyl-4,4'-biphenyl diisocyanate and 3,3'-dimethyldiphenylmethane-4,4'-diisocyanate; the triisocyanates such as 4,4',4''-triphenylmethane triisocyanate, and toluene 2,4,6-triisocyanate; and the tetraisocyanates such as 4,4'-dimethyldiphenylmethane-2,2'-5,5'-tetraisocyanate and polymeric polyisocyanates such as polymethylene polyphenylene polyisocyanate. Especially useful in admixture with toluenediisocyanate due to their availability and properties are 2,2'-, 2,4'-, 4,4'-diphenylmethane diisocyanate and polymethylene polyphenylene polyisocyanate and their mixtures.

Crude polyisocyanates, as indicated previously, may also be used in the compositions of the present invention, such as crude toluene diisocyanate obtained by the phosgenation of a mixture of toluene diamines or crude diphenylmethane isocyanate obtained by the phosgenation of crude diphenylmethane diamine. The preferred or crude isocyanates are disclosed in U.S. Pat. No. 3,215,652. Preferably, however, the isocyanate component is toluene diisocyanate alone.

Chain-extending agents which may be employed in the preparation of the polyurethane foams include those compounds having at least two functional groups bearing active hydrogen atoms such as water, hydrazine, primary and secondary diamines, amino alcohols, amino acids, hydroxy acids, glycols, or mixtures thereof. A preferred group of chain-extending agents includes water, ethylene glycol, 1,4-butanediol and primary and secondary diamines which react more readily with the prepolymer than does water such as phenylene diamine, 1,4-cyclohexane-bis-(methylamine), ethylenediamine, diethylenetriamine, N-(2-hydroxypropyl)ethylenediamine, N,N'-di(2-hydroxypropyl)ethylenediamine, piperazine, and 2-methylpiperazine.

The melamine utilized in the subject invention should be substantially uncrushed. Preferably, ordinary commercial melamine having mean particle sizes from 25–500 $\mu$m is preferred. If desired, melamine with larger mean particle sizes for example greater than about 50–90 $\mu$m may be subjected to conventional grinding techniques to reduce the mean particle size to 35 $\mu$m or so. This grinding may be done in grinding apparatus known to those skilled in the art, for example jet mills, fluidized bed mills, sand mills, ball mills, or the like.

If the particle size is reduced by too great an amount, then the foams prepared from them may collapse. Thus it is preferable to use ordinary commercial melamine. The melamine particle size should be such that less than 5 percent of the particles are less than 10 $\mu$m in diameter, and preferably such that less than 0.5 percent are less than 10 $\mu$m while less than 5.0 percent are less than 20 $\mu$m. Melamine having particles such that the median particle sizes are 66.7, 121.4, and 142.9 $\mu$m respectively; with mean particle sizes of 41.2, 86.7, and 83.8 $\mu$m respectively; and standard deviations of 68.8, 96.1, and 186.2 $\mu$m respectively have been shown to be particularly well suited to the practice of the subject invention.

By the term "substantially uncrushed" is meant melamine whose particle sizes fall within the ranges described above, and which is preferably obtained in such form from the supplier. The term "substantially uncrushed" does not exclude minor crushing or grinding of the melamine in the polyol when such in situ crushing does not reduce the mean particle size by 35 percent or more, as such minor crushing would not be expected to alter the essential character of the melamine utilized, and thus would be within the scope and spirit of the invention. The term "substantially uncrushed" does not include stable melamine dispersions produced either by grinding in situ or grinding in the absence of polyol until the mean particle size as measured using a Brinkman Particle Analyzer Model 2010 by the area density method is less than 20 μm.

It has been found that at higher melamine levels, i.e. above 15 weight percent, the particle size of the melamine becomes a definite factor. When the mean particle size becomes appreciably less than 40 μm, the foams become unstable and are of limited commercial usefulness. Even at a mean size of about 42 μm, some difficulty is experienced at a level of 50 parts of melamine per 100 parts polyol. However, it is expected that these difficulties can be overcome by reformulation. Thus 40 μm represents a reasonable lower particle size limit for melamine a high levels. At lower levels, smaller particle sizes may be used, i.e. down to the sizes previously discussed.

The melamine is preferably merely added to the polyols in the holding tank and agitated to insure against settling, as the preferred melamine/polyol mixtures are not stable dispersions. The melamine/polyol slurry is then pumped into the polyurethane mix head as with a conventional polyol. If the particular equipment utilizes filter screens in the polyol side, these must be removed, or the relatively large melamine particles will quickly result in a plugged filter.

Among the flame retardant compounds in conjunction with melamine which may be employed are halogenated organic flame retardants such as tetrakis(2-chloroethyl)ethylene phosphonate, pentabromodiphenyl oxide, tris(chloropropyl) phosphate, tris(1,3-dichloropropyl)phosphate, tris(betachloroethyl)phosphate, 2,3-dibromopropanol, hexabromocyclododecane, dibromoethyldibromocyclohexane, tris(2,3-dibromopropyl)phosphate, and tris(betachloropropyl)-phosphate, and alkyl phosphates such as tricresyl phosphate. The liquid halogenated alkylphosphate esters such as those listed above by way of example are particularly useful. Numerous flame retardants are available commercially, for example under the tradename FYROL® CEF, FYROL® FR-2, THERMOLIN® 101, FIREMASTER® 836, and the like.

Any suitable catalyst may be used including tertiary amines such as, for example, triethylenediamine, N-methylmorpholine, N-ethylmorpholine, diethylethanolamine, N-cocomorpholine, 1-methyl-4-dimethylaminoethylpiperazine, 3-methoxypropyldimethylamine, N,N,N'-trimethylisopropyl propylenediamine, 3-diethylaminopropyldiethylamine, dimethylbenzylamine, and the like. Other suitable catalysts are, for example, stannous chloride, dibutyltin di-2-ethyl hexanoate, stannous oxide, as well as other organometallic compounds such as are disclosed in U.S. Pat. No. 2,846,408.

A surface-active agent is generally necessary for production of high grade polyurethane foam according to the present invention, since in the absence of same, the foams collapse or contain very large uneven cells. Numerous surface-active agents have been found satisfactory. Nonionic surface active agents are preferred. Of these, the nonionic surface-active agents such as the well-known silicones have been found particularly desirable. Other surface-active agents which are operative, although not preferred, include polyethylene glycol ethers of long chain alcohols, tertiary amine or alkanolamine salts of long chain alkyl acid sulfate esters, alkyl sulfonic esters, and alkyl arylsulfonic acids.

The following examples illustrate the nature of the invention. All parts are by weight unless otherwise stated. In the examples, the physical properties of the polyurethane foam were determined by the following ASTM tests:

Density—D1622-63
Tensile Strength—D1623-72
Elongation—D412
Split Tear—D470
Compression Set—D395
Compression Load—D1564
Humid Aging—D1564
Dynamic Fatigue Test—D-3574I$_2$ and /D-3574I$_3$
Additional tests included the
California Bulletin No. 117 Test, Section D, Part II The following abbreviations are employed in the examples below:

Polyol A is a propylene oxide adduct of trimethylolpropane capped with 15 weight percent ethylene oxide having a hydroxyl number of 25.

Polyol B is a propylene oxide, adduct of glycerine capped with 16.5 weight percent ethylene oxide having a hydroxyl number of 35.

Polyol C is a propylene oxide adduct of trimethylolpropane capped with 13 weight percent ethylene oxide having a hydroxyl number of 35.

Polyol E is a mixture of Polyol C and Polyol D containing a graft polymer dispersion of 31 weight percent of 1:1 styrene:acrylonitrile having a hydroxyl number of 24.

Polyol F is a propylene oxide, ethylene oxide heteric adduct of glycerine containing 12 weight percent ethylene oxide having a hydroxyl number of 56.

Polyol G is a blend of 49.8 weight percent Polyol B, 38.4 weight percent Polyol E and 11.5 weight percent Polyol C.

Polyol I is a propylene oxide ethylene oxide heteric adduct of glycerine containing 12.5 weight percent ethylene oxide having a hydroxyl number of 50.0.

Polyol J is a mixture of Polyol D and Polyol I containing a graft polymer dispersion of 40 weight percent of 2:1 styrene:acrylonitrile having a hydroxyl number of 29.0.

DEOA is diethanolamine.
TEOA is triethanolamine.
Silicone 5309 is a silicone surfactant manufactured by Dow Corning Corporation.
T-12 is dibutyltin dilaurate.
Freon 11 is monofluorotrichloromethane.
Dabco 33LV is a 33 percent solution of triethylene diamine in dipropylene glycol.
Niax A-1 is an amine catalyst manufactured by Union Carbide Corporation.
TDI is toluene diisocyanate.
Fyrol FR-2 is tri($\beta,\beta'$-dichloro-isopropyl)phosphate manufactured by Stauffer Chemical Corporation.
Firemaster 836 is 3-bromo-2,2-dimethylpropyl-2-chloroethyl-2-bromoethyl phosphate.
Reactint Blue X-8515 is a polymeric colorant manufactured by Milliken Chemical.
Silicone DC-5043 is a silicone surfactant manufactured by Dow Corning Corporation.

Reactint Red X-26850 is a polymeric colorant manufactured by Milliken Chemical.

Reactint Yellow X-74 is a polymeric colorant manufactured by Milliken Chemical.

Silicone B-3640 is a silicone surfactant manufactured by Goldschmidt AG.

DOP is dioctylphthalate.

PCF is pounds per cubic foot.

CFM is cubic feet per minute.

EXAMPLES 1-25

Examples 1-25 were prepared by employing the following procedure:

The components as indicated in Tables I-VII which were placed into various tanks were metered into a Hennecke UBT foam machine running with a mixer speed of 5000 rpm in the amounts indicated. The mixture was discharged from the mixing head unto a conveyor. The foam expanded to its full height in about three minutes. After a sufficient cure time the foams were submitted for physical property determinations.

TABLE I

| | Example | | | | | | | | | |
|---|---|---|---|---|---|---|---|---|---|---|
| | 1 | 2 | 3 | 4 | 5 | 6 | 7 | 8 | 9 | 10 |
| FORMULATION | | | | | | | | | | |
| Polyol F | 100.0 | | | | | | | | | |
| FYROL FR-2 | 12.0 | — | — | — | — | — | 6.0 | | | |
| Melamine | — | — | — | — | — | — | 15.0 | | | |
| Silicone B-3640 | 1.0 | | | | | | | | | |
| T-10/DOP (50/50) | 1.3 | 1.1 | 0.9 | 1.3 | 1.1 | 0.9 | 1.1 | 0.9 | 1.1 | 0.9 |
| Water | 4.7 | 4.7 | 4.7 | 3.2 | 3.2 | 3.2 | 4.7 | 4.7 | 3.2 | 3.2 |
| DABCO 33LV | 0.26 | 0.26 | 0.26 | 0.18 | 0.18 | 0.28 | 0.26 | 0.26 | 0.18 | 0.18 |
| Reactint Red X-26850 | 0.2 | | | | | | | | | |
| TDI (115 Index) | 62.25 | 62.25 | 62.25 | 45.57 | 45.57 | 45.57 | 62.25 | 62.25 | 45.57 | 45.57 |
| Density, pcf | 1.39 | 1.42 | 1.47 | 1.80 | 1.86 | 1.91 | 1.52 | 1.54 | 2.02 | 2.01 |
| FLAMMABILITY PROPERTIES | | | | | | | | | | |
| California 117, Original | | | | | | | | | | |
| Vertical | Pass | Fail | Fail | Pass | Pass | Pass | Fail | Fail | Pass | Pass |
| Smoldering | 99.7 | 85.0 | 71.7 | 99.5 | 99.3 | 78.5 | 97.0 | 82.0 | 99.3 | 80.8 |
| Air Flow, cfm | 1.3 | 3.3 | 4.4 | 0.6 | 1.3 | 2.6 | 2.9 | 5.8 | 0.7 | 3.8 |
| FATIGUE, 4000 CYCLES - 30 LBS. | | | | | | | | | | |
| Smoldering | 71.9 | 69.3 | 72.8 | 66.4 | 74.7 | 72.0 | 94.7 | 81.6 | 97.5 | 80.4 |
| Air Flow, cfm | 2.3 | 3.6 | 5.2 | 3.3 | 2.8 | 4.8 | 4.0 | 5.7 | 3.4 | 4.5 |

| | Example | | | | | | | | | |
|---|---|---|---|---|---|---|---|---|---|---|
| | 11 | 12 | 13 | 14 | 15 | 16 | 17 | 18 | 19 | 20 |
| FORMULATION | | | | | | | | | | |
| Polyol F | 100.0 | | | | | | | | | |
| FYROL FR-2 | 3.0 | | | | | — | — | — | — | |
| Melamine | 20.0 | | | | 25.0 | | | | | |
| Silicone B-3640 | 1.0 | | | | | | | | | |
| T-10/DOP (50/50) | 1.1 | 0.9 | 1.1 | 0.9 | 1.3 | 1.1 | 0.9 | 1.3 | 1.1 | 0.9 |
| Water | 4.7 | 4.7 | 3.2 | 3.2 | 4.7 | 4.7 | 3.2 | 3.2 | 3.2 | 3.2 |
| DABCO 33LV | 0.26 | 0.26 | 0.18 | 0.18 | 0.26 | 0.26 | 0.26 | 0.18 | 0.18 | 0.18 |
| Reactint Red X-26850 | 0.2 | | | | | | | | | |
| TDI (115 Index) | 62.25 | 62.25 | 45.57 | 45.57 | 62.25 | 62.25 | 62.25 | 45.57 | 45.57 | 45.57 |
| Density, pcf | 1.53 | 1.56 | 2.02 | 2.03 | 1.49 | 1.498 | 1.48 | 1.91 | 1.98 | 20.1 |
| FLAMMABILITY PROPERTIES | | | | | | | | | | |
| California 117, Original | | | | | | | | | | |
| Vertical | Fail | Fail | Pass | Pass | Fail | Fail | Fail | Fail | Pass | Pass |
| Smoldering | 98.7 | 86.6 | 99.6 | 98.8 | 99.6 | 99.3 | 99.0 | 99.6 | 99.7 | 98.9 |
| Air Flow, cfm | 3.7 | 5.7 | 1.4 | 4.3 | 0.7 | 2.2 | 4.9 | 0.4 | 0.9 | 2.7 |
| FATIGUE, 4000 CYCLES - 30 LBS. | | | | | | | | | | |
| Smoldering | 97.6 | 97.5 | 98.6 | 99.1 | 98.6 | 98.3 | 99.5 | 98.5 | 95.6 | 98.5 |
| Air Flow, cfm | 3.5 | 5.5 | 3.6 | 4.4 | 1.3 | 4.1 | 2.9 | 1.6 | 4.9 | 3.7 |

TABLE II

| | | Example | |
|---|---|---|---|
| | STREAM | 21 | 22 |
| FORMULATION | | | |
| Polyol G | I | 100.0 | 90.0 |
| DEOA | I | 1.0 | |
| T-12 | I | 0.15 | 0.135 |
| Reactint Blue X-8515 | I | 0.1 | 0.09 |
| FIREMASTER 836 | I | — | 3.0 |
| Reactint Yellow X-74 | I | — | 0.045 |
| Polyol G | II | — | 10.0 |
| Melamine | II | — | 5.0 |
| DEOA | II | — | 0.1 |
| T-12 | II | — | 0.015 |
| Reactint Red X-26850 | II | — | 0.01 |
| Water | III | 2.0 | 2.3 |
| DABCO 33LV | III | 0.18 | 0.21 |
| NIAX A-1 | III | 0.06 | 0.07 |
| Silicone L-5309 | IV | 1.2 | 1.2 |
| FIREMASTER 836 | V | 6.0 | |
| Reactint Yellow | V | 0.1 | |
| DEOA | V | | 1.035 |
| TDI | VI | 29.25 | 32.44 |
| Index | | 110 | 110 |
| FOAM PROPERTIES | | | |
| Density, pcf | | 2.71 | 2.45 |
| Tensile, psi | | 20.7 | 19.8 |
| Elongation, % | | 147 | 157 |
| Tear, pi | | 1.8 | 2.1 |
| Resilience, % | | 52 | 60 |
| ILD, lb/50 sq. in. (4 inch) | | | |
| 25% | | 35.6 | 35.2 |
| 65% | | 88.6 | 84.4 |
| Sag Factor | | 2.49 | 2.40 |
| Recovery, % | | 84.3 | 79.6 |

TABLE II-continued

| STREAM | Example 21 | 22 |
|---|---|---|
| Compression Sets, % | | |
| 50% | 9.1 | 10.6 |
| 90% | 7.8 | 75.2 |
| Humid Aged 5 Hrs. at 250° F. | | |
| CLD, % of Original 50% | 54.2 | 47.3 |
| Compression Set, % | | |
| 50% | 25.3 | 26.8 |
| 90% | 79.2 | 58.1 |
| H.A. Tensile Strength, psi | 20.4 | 17.7 |
| Air Flow, cfm | 1.0 | 0.9 |
| Pounding Fatigue, % Loss (2 inch) | | |
| Height | 0.6 | 0.2 |
| 40% ILD | 20.5 | 31.6 |
| Flammability Properties | | |
| California 117 Open Flame | | |
| Original | Pass | Pass |
| Heat Aged | Pass | Pass |
| California 117 Smoldering Spec. Min. | | |
| Original 80% | 99.6 | 98.2 |
| Crushed | 61.6 | 95.8 |
| Fatigued | 64.1 | 95.5 |

TABLE III

| | Example 23 | 24 | 25 |
|---|---|---|---|
| FORMULATION | | | |
| Polyol A | 100.0 | — | — |
| Polyol I | — | 100.0 | 82.0 |
| Polyol J | — | — | 18.0 |
| Stannous Octoate | 0.37 | 0.24 | 0.11 |
| NIAX A-1 | 0.16 | 0.12 | 0.09 |
| Silicone 5309 | 1.85 | 1.05 | 1.10 |
| Methylene Chloride | 16.5 | 4.5 | 0.70 |
| H$_2$O 3.90 | 3.85 | 2.85 | |
| FYROL FR-2 | 12.0 | 12.7 | 12.8 |
| TDI | 53.8 | 51.0 | 42.0 |
| Index | 1.2 | 1.1 | 1.2 |
| Physical Properties | | | |
| Density, pcf | 1.0 | 1.4 | 2.1 |
| Air Flow, cfm | 4.0 | 1.6 | 2.7 |

Examples 23–25 are illustrated in FIG. I. The products illustrated in FIGS. II–IV were prepared in a manner similar to those in Examples 1–25.

The embodiments of the invention in which an exclusive privilege or property is claimed are defined as follows:

1. A flame retardant flexible polyurethane foam which retains its cigarette smoldering resistance after service, comprising the reaction product of (a) a polyoxyalkylene polyether polyol, (b) toluenediisocyanate, (c) a blowing agent, (d) a catalyst, (e) a surfactant, (f) substantially uncrushed melamine, and (g) optionally a flame retardant other than melamine, wherein the concentration of melamine is from about 5 weight percent to about 25 weight percent of the weight of the foam, wherein the density of the foam is from at least 1.2 lbs/ft$^3$ to about 4 lbs/ft$^3$, and wherein the melamine has a mean particle size of about 40 μm or more.

2. The foam of claim 1 wherein the polyol has an equivalent weight from 1000 to 10,000 and a functionality of two to four.

3. The foam of claim 1 wherein the density of the foam is from 1.5 lbs/ft$^3$ to about 4 lbs/ft$^3$.

4. The foam of claim 1 wherein the density of the foam is from 2.0 lbs/ft$^3$ to about 3.5 lbs/ft$^3$.

5. The foam of claim 1 wherein said foam is a high resiliency foam.

6. A flame retardant flexible polyurethane foam which retains its cigarette smoldering resistance after service, comprising (a) a polyoxyalkylene polyether polyol, (b) toluenediisocyanate, (c) a blowing agent, (d) a catalyst, (e), a surfactant, (f) substantially uncrushed melamine, and (g) a flame retardant other than melamine, wherein the concentration of melamine is from about 5 weight percent to about 25 weight percent of the weight of the foam, wherein the density of the foam is from at least 1.2 lbs/ft$^3$ to about 4 lbs/ft$^3$, and wherein the melamine has a mean particle size of about 40 μm or more.

7. The foam of claim 6 wherein the flame retardant is a halogenated organic flame retardant.

8. The foam of claim 6 wherein the flame retardant is a liquid phosphate ester flame retardant.

9. The foam of claim 8 wherein the flame retardant is a halogenated phosphate ester flame retardant.

10. The foam of claim 6 wherein said flame retardant is present in an amount of from 1.0 to about 10.0 weight percent based on the weight of the foam.

11. A flame retardant flexible polyurethane foam which retains its cigarette smoldering resistance after service, comprising (a) a polyoxyalkylene polyether polyol, (b) toluenediisocyanate, (c) a blowing agent, (d) a catalyst, (e) a surfactant, (f) substantially uncrushed melamine, and (g) optionally flame retardants other than melamine, wherein the concentration of melamine is from about 5 weight percent to about 15 weight percent of the weight of the foam, wherein the density of the foam is from at least 1.2 lbs/ft$^3$ to about 4 lbs/ft$^3$.

12. The foam of claim 11 wherein the polyol has an equivalent weight from 1000 to 10,000 and a functionality of two to four.

13. The foam of claim 11 wherein the density of the foam is from 1.5 lbs/ft$^3$ to about 4 lbs/ft$^3$.

14. The foam of claim 11 wherein the density of the foam is from 2.0 lbs/ft$^3$ to about 3.5 lbs/ft$^3$.

15. The foam of claim 11 wherein said foam is a high resiliency foam.

16. A flame retardant flexible polyurethane foam which retains its cigarette smoldering resistance after service, comprising (a) a polyoxyalkylene polyether polyol, (b) toluenediisocyanate, (c) a blowing agent, (d) a catalyst, (e) a surfactant, (f) uncrushed melamine, and (g) a flame retardant other than melamine, wherein the concentration of melamine is from about 5 weight percent to about 15 weight percent of the weight of the foam, wherein the density of the foam is from at least 1.2 lbs/ft$^3$ to about 4 lbs/ft$^3$.

17. The foam of claim 16 wherein the flame retardant is a halogenated organic flame retardant.

18. The foam of claim 6 wherein the flame retardant is a liquid phosphate ester flame retardant.

19. The foam of claim 8 wherein the flame retardant is a halogenated phosphate ester flame retardant.

20. The foam of claim 16 wherein said flame retardant is present in an amount of from 1.0 to about 10.0 weight percent based on the weight of the foam.

* * * * *

UNITED STATES PATENT AND TRADEMARK OFFICE
CERTIFICATE OF CORRECTION

PATENT NO. : 4,892,893

DATED : January 9, 1990

INVENTOR(S) : Oscar M. Grace, Theodore M. Smiecinski, Steven E. Wujcik

It is certified that error appears in the above-identified patent and that said Letters Patent is hereby corrected as shown below:

On the title page, after item [76] Assignee, please insert the following:
  --Notice: The portion of the term of this patent subsequent to May 17, 2005, has been disclaimed.--

On the title page, after the line containing the filing date.

--Continuation-In-Part of Serial No. 075,330, July 20, 1987, Patent No. 4,826,884--.

Signed and Sealed this

Twenty-first Day of December, 1993

Attest:

BRUCE LEHMAN

Attesting Officer     Commissioner of Patents and Trademarks